(12) United States Patent
Ghoneim et al.

(10) Patent No.: US 6,813,552 B2
(45) Date of Patent: Nov. 2, 2004

(54) METHOD AND APPARATUS FOR VEHICLE STABILITY ENHANCEMENT SYSTEM

(75) Inventors: Youssef Ahmed Ghoneim, Macomb Township, Macomb County, MI (US); Christian Bielaczek, Bad Vilbel (DE); Thomas Jenny, Seeheim-Jugenheim (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/298,895

(22) Filed: Nov. 18, 2002

(65) Prior Publication Data

US 2004/0098184 A1 May 20, 2004

(51) Int. Cl.[7] .......................... G06F 17/00; B60K 26/00
(52) U.S. Cl. ........................................ 701/70; 180/333
(58) Field of Search .................. 701/36–37, 40–41, 701/44, 48, 53, 65, 55–59, 70–72, 74–75, 77–80, 83; 180/333–400, 415; 280/5.5, 5.51, 5.512, 5.519

(56) References Cited

U.S. PATENT DOCUMENTS

| | | | |
|---|---|---|---|
| 5,037,119 A | * | 8/1991 | Takehara et al. ............ 180/415 |
| 5,483,446 A | * | 1/1996 | Momose et al. ................ 701/1 |
| 5,508,921 A | | 4/1996 | Chikuma et al. ...... 364/424.05 |
| 5,524,079 A | | 6/1996 | Ishida et al. ........... 364/424.05 |
| 5,720,533 A | | 2/1998 | Pastor et al. ................ 303/147 |
| 5,746,486 A | | 5/1998 | Paul et al. .................... 303/146 |
| 6,041,886 A | | 3/2000 | Nakaishi et al. ............ 180/444 |
| 6,112,147 A | | 8/2000 | Ghoneim et al. ............. 701/80 |
| 6,125,319 A | | 9/2000 | Hac et al. ...................... 701/80 |
| 6,161,905 A | | 12/2000 | Hac et al. .................... 303/146 |
| 6,169,951 B1 | | 1/2001 | Ghoneim et al. ............. 701/70 |
| 6,175,790 B1 | | 1/2001 | Lin et al. ....................... 701/36 |
| 6,195,606 B1 | | 2/2001 | Barta et al. ................... 701/70 |
| 6,205,391 B1 | | 3/2001 | Ghoneim et al. ............. 701/70 |
| 6,409,287 B1 | * | 6/2002 | Leach et al. ................ 303/146 |
| 6,499,813 B1 | * | 12/2002 | Wandel ................... 303/115.4 |

OTHER PUBLICATIONS

Furukawa, Yoshimi et al., "A Review of Four–Wheel Steering Studies from the Viewpoint of Vehicle Dynamics and Control".

Whitehead, John C., "Response and Stability of Rear Wheel Steering Vehicles".

* cited by examiner

Primary Examiner—Thu V. Nguyen
(74) Attorney, Agent, or Firm—Kathryn A. Marra

(57) ABSTRACT

A vehicle stability enhancement (VSE) system for a vehicle having at least one vehicle subsystem includes; at least one sensor for sensing at least one vehicle parameter, at least one vehicle control system for adjusting the at least one vehicle subsystem, a driving mode switch for selecting at least one driving mode, at least one memory comprising at least one set of gain factors, and a controller responsive to the at least one sensor, the driving mode switch, and the at least one set of gain factors for controlling the at least one vehicle control system.

19 Claims, 5 Drawing Sheets

METHOD AND APPARATUS FOR VEHICLE STABILITY ENHANCEMENT SYSTEM

TECHNICAL FIELD

This invention relates generally to a vehicle stability enhancement (VSE) system and a method of operation thereof, and more particularly to an integrated set of vehicle chassis subsystems responsive to a controller that is part of the VSE system.

BACKGROUND

Traditional vehicle chassis subsystems, such as steering, braking and suspension subsystems, are passive, meaning that their responsiveness under operating conditions is determined prior to the vehicle leaving the point of manufacture. In such traditional arrangements, the design of the particular chassis subsystem must be determined up-front and must take into consideration the purpose of the vehicle, such as, for example, whether the vehicle will be used primarily as a cruising vehicle or whether it will be used primarily as a sporty, high performance, vehicle. By design, such traditional chassis subsystems cannot adapt or actively respond in real time to a change in driving mode as requested by the driver. However, advancements in sensing and computing technologies has led to the active control of a vehicle's braking subsystem to provide anti-lock brake control (ABS) and positive acceleration traction control (TCS).

SUMMARY

In one embodiment, a vehicle stability enhancement system (VSE) for a vehicle having at least one vehicle subsystem is provided, which comprises; at least one sensor for sensing at least one vehicle parameter, at least one vehicle control system for adjusting the at least one vehicle subsystem, a driving mode switch for selecting at least one driving mode, at least one memory comprising at least one set of gain factors, and a controller responsive to the at least one sensor, the driving mode switch, and the at least one set of gain factors for controlling the at least one vehicle control system.

In another embodiment, a method for actively controlling a vehicle stability enhancement system is provided, which comprises; sensing at least one vehicle parameter, calculating a yaw rate error index (OSUS) in response to the at least one vehicle parameter, calculating the state of at least one control flag in response to the at least one vehicle parameter, determining the state of a driving mode in response to a driving mode request, determining the state of the at least one control flag in response to the state of the driving mode, and determining at least one control gain factor in response to the state of the at least one control flag and the yaw rate error index.

BRIEF DESCRIPTION OF THE DRAWINGS

Referring now to the figures, which are exemplary embodiments, and wherein like elements are numbered alike.

DETAILED DESCRIPTION

A detailed description of an embodiment of the present invention is presented herein by way of exemplification and not limitation with reference to FIGS. 1–7.

Vehicle

Figure 1:
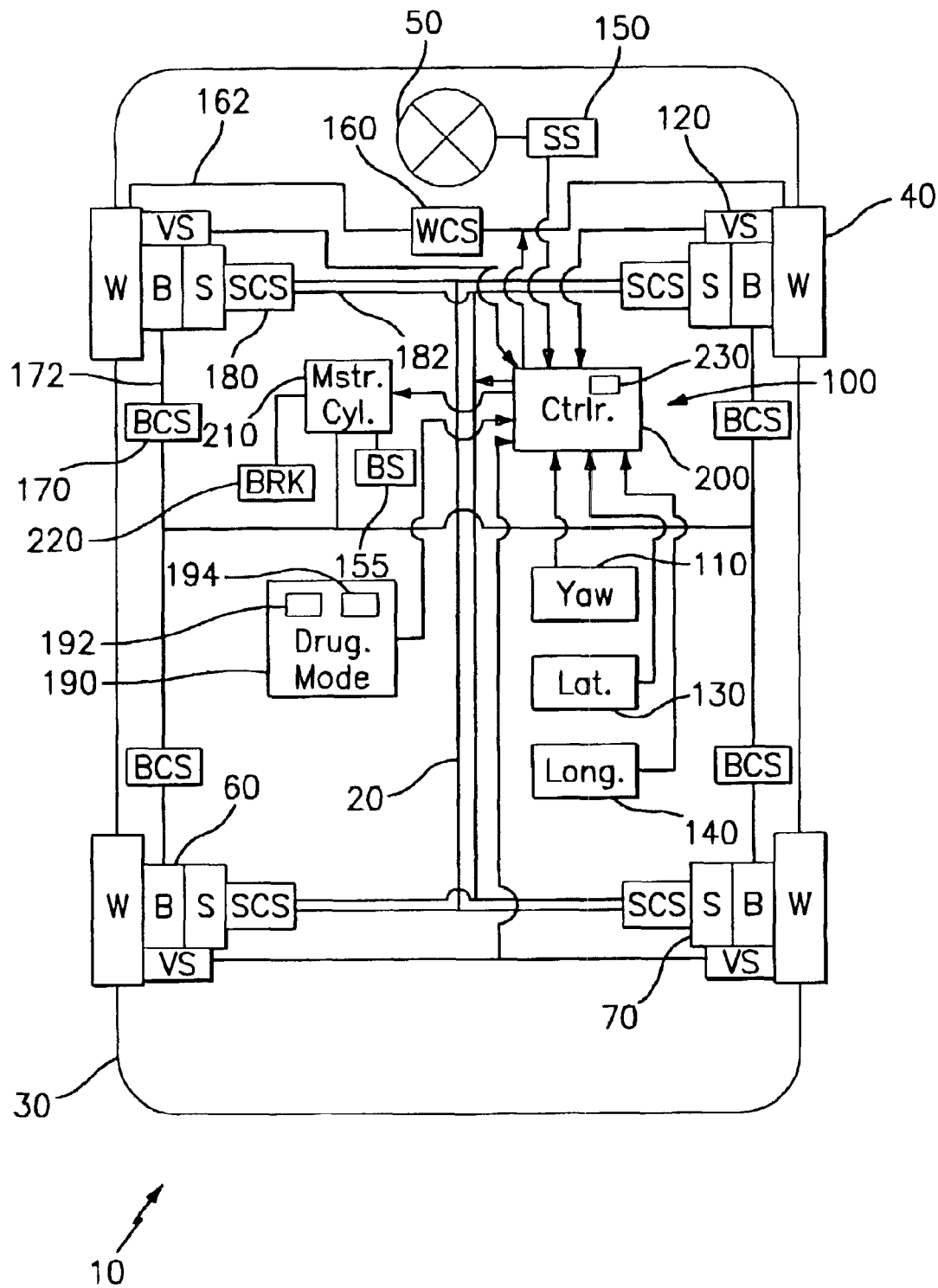
FIG. 1 depicts a generalized schematic of a vehicle operative for implementing the present invention.

FIG. 1 depicts a generalized schematic of a vehicle 10 having a chassis 20, a body 30 arranged on chassis 20, a set of wheels ("W") 40 rotationally coupled to chassis 20, a steering mechanism 50 arranged for steering wheels 40, a braking mechanism ("B") 60 arranged for decelerating wheels 40 upon command, a suspension mechanism ("S") 70 disposed between wheels 40 and chassis 20 for damping vibration at wheels 40, and an integrated chassis control system (ICCS) 100. Steering mechanism 50, braking mechanism 60, and suspension mechanism 70 are alternatively referred to as vehicle subsystems. The ICCS 100 includes: a yaw rate sensor ("Yaw") 110 for sensing the actual vehicle yaw rate in degrees-per-second; wheel velocity sensors ("VS") 120; a lateral acceleration sensor ("Lat") 130, such as for example an accelerometer, for sensing the absolute value of the vehicle's lateral acceleration in g-force; a longitudinal acceleration sensor 140 ("Long") (e.g., accelerometer) for sensing the absolute value of the vehicle's longitudinal acceleration in g-force; a steering angle sensor ("SS") 150 for sensing the angle of steer for the steering wheels; and a brake pressure sensor ("BS") 155 for sensing the brake fluid pressure. The sensed parameters are herein referred to as vehicle parameters. The ICCS 100 also includes the following vehicle control systems: a steering mechanism control system ("WCS") 160, such as, for example, electronically controlled actuators and dampers, for adjusting the stiffness and damping characteristics of, and the degree of steering assist associated with, the steering mechanism 50; a braking mechanism control system ("BCS") 170 (e.g., electronically controlled actuators and dampers) for adjusting the stiffness and damping characteristics of, and the degree of pressure-apply rate associated with, the braking mechanism 60; and a suspension mechanism control system ("SCS") 180 (e.g., electronically controlled actuators and dampers) for adjusting the stiffness and damping characteristics of the suspension mechanism 70. The ICCS 100 further includes: a driving mode switch ("Drvg Mode") 190 for enabling a driver to selectively choose between multiple driving modes, such as, for example, "Normal" and "Sporty" modes, where the "Normal" mode may be for highway cruising and the "Sporty" mode may be for high performance handling; and a central controller 200 arranged in operable communication with sensors 110, 120, 130, 140, 150, 155, and mechanism control systems 160, 170, 180. Control lines 162, 172, 182, are depicted, for simplicity, as single lines, but represent both signal communication lines and operational links for communicating with and actuating the mechanism control systems 160, 170, 180, respectively. Driving mode switch 190 may include a pushbutton type switch 192, or any other type of switch suitable for producing a driving mode request signal, and a display 194 for providing feedback to the driver regarding the driving mode setting. BCS 170 is in operable communication with controller 200 via brake master cylinder ("Mstr Cyl") 210. "Mstr Cyl" 210 is also in operable communication with brake pedal ("Brk") 220. Braking mechanism 60 may be operated by the driver via brake pedal 220 and master cylinder 210, or by controller 200 via the ICCS 100, master cylinder 210, and brake mechanism control system 170. Brake pressure sensor 155 senses the brake fluid pressure in brake master cylinder 210. It will be appreciated that while BCS 170 is depicted in the schematic of FIG. 1 as being located between master cylinder 210 and each braking mechanism 60, it may also be located between controller 200 and master cylinder 210, depending on whether individual or concurrent wheel braking is desired. Controller 200 includes a memory 230 for storing sensor information, register information and settings, discussed below, and look-up tables of gain factors, also discussed below.

It will also be appreciated that while the disclosed embodiment refers to only two driving modes, the invention described herein is applicable to any number of driving modes. It will further be appreciated that while the disclosed embodiment refers to a vehicle, such as an automobile, having four wheels, the invention described herein is applicable to any vehicle with any number of wheels. Such alternative vehicles to the disclosed embodiment may be, for example and without limitation, a three-wheel or six-wheel off-road vehicle, designed with normal, sporty, and hill climbing driving modes.

Nomenclature

Figure 3:
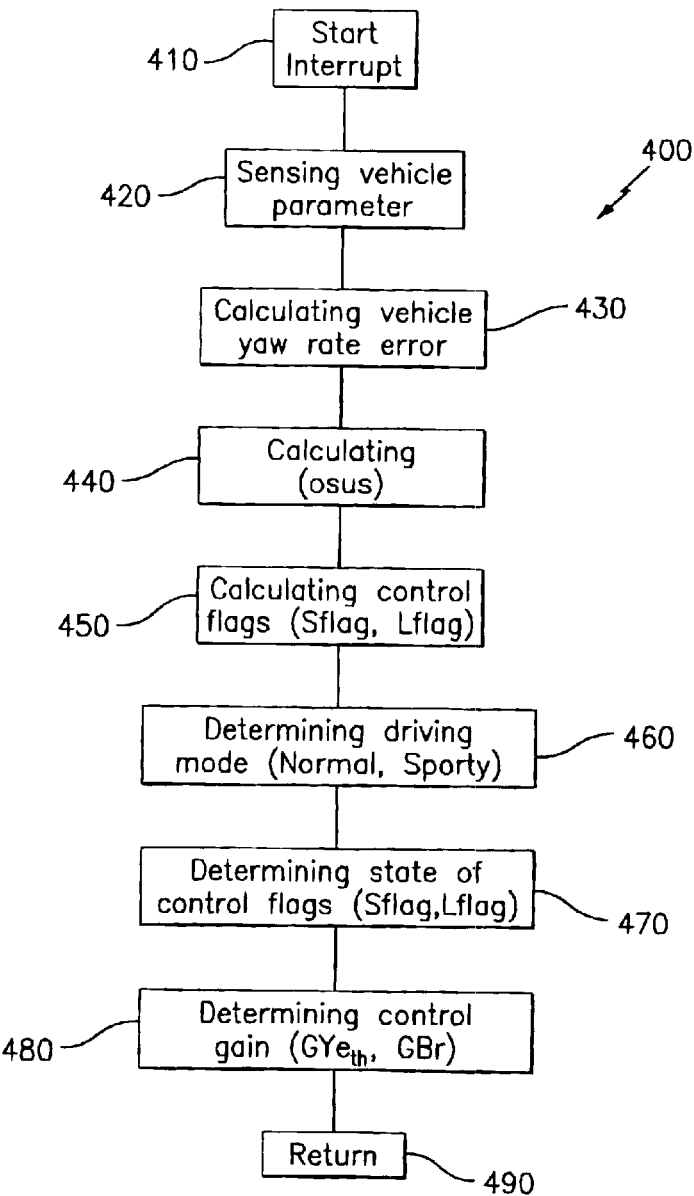
FIG. 3 depicts a method for implementing the present invention.

The nomenclature used herein for implementing the present invention is as follows:

"Mode"=Register containing vehicle actual mode (e.g., "Normal" or "Sporty");

"|ay|"=Register containing absolute value of vehicle lateral acceleration (g-force);

"ay_th"=Register containing lateral acceleration threshold (g-force), for example, 0.5–0.6 g;

"Yaw"=Register containing vehicle actual yaw rate (degrees-per-second, deg/sec));

"Yaw_command"=Register containing yaw rate command based on driver input (deg/sec) (see FIG. 3);

"Ye"=Register containing vehicle yaw rate error (deg/sec);

"Ye_th"=Register containing yaw rate error threshold (deg/sec);

"Ye_thr1"=Register containing calibration value, for example, 4-deg/sec.

"deltaY"=Register containing ratio of yaw rate error ("Ye") to yaw rate error threshold ("Ye_thr");

"OSUS"=Register containing vehicle oversteer/understeer yaw rate error index;

"OSUS_th"=Register containing vehicle OSUS index threshold;

"VSE"=Register containing state of vehicle stability enhancement flag, for example, ON in response to vehicle stability enhancement system being active, and OFF in response to vehicle stability enhancement system being inactive;

"MCP"=Register containing value of master cylinder pressure;

"MCP_th"=Register containing value of master cylinder pressure threshold, for example, 5 bars;

"T"=Register containing control sampling time interval, for example, 10-milliseconds (msec);

"SFlag(t)"=Register containing state of the hi mu surface flag, which is used to differentiate between a high friction surface and a low friction surface condition;

"LFlag(t)"=Register containing state of stability limit flag, which is used to detect if the stability of the vehicle is at a limit when operated in the sporty mode;

"B_r"=Register containing the value of the brake pressure apply rate;

"GYe_th"=Register containing the look-up table value of the yaw rate error threshold gain;

"GB_r"=Register containing the look-up table value of the brake pressure apply rate gain; where "| |" designates an "absolute value" operator, and a single quotation (') designates a derivative operator.

Yaw rate error threshold ("Ye_th") may be set to a predetermined value, such as, for example, 8-deg/sec, or it may be calculated as described in the commonly assigned U.S. Pat. No. 5,720,533, entitled "Brake Control System", filed Oct. 15, 1996 (the '533 patent), which is herein incorporated by reference in its entirety.

Yaw rate command ("Yaw_command") may be calculated as described in commonly assigned U.S. Pat. No. 5,746,486, entitled "Brake Control System", filed Aug. 29, 1997 (the '486 patent), which is herein incorporated by reference in it entirety, or it may be calculated according to the following equation:

$$\text{Yaw\_command} = (Vx)(d)/(L+(Ku)(Vx)2), \quad \text{Equa. 1}$$

where;

Vx=vehicle speed, d=steering angle,

L=vehicle wheel base, and

Ku=understeer coefficient.

Controller

Controller 200 is a microprocessor based control system adapted for actively controlling an integrated set of chassis subsytems, for example, steering mechanism 50, braking mechanism 60 and suspension mechanism 70, in accordance with control logic that includes the determination of control gain factors "GYe_th" and "GB_r" for controlling the yaw rate error threshold ("Ye_th") and brake pressure apply rate ("B_r"). Controller 200 typically includes a microprocessor, ROM and RAM, and appropriate input and output circuits of a known type for receiving the various input signals and for outputting the various control commands to the various actuators and control systems. The control logic implemented by controller 200 is cycled at a control sampling rate of "T", and is best seen by referring to FIGS. 2–7.

Figure 2:
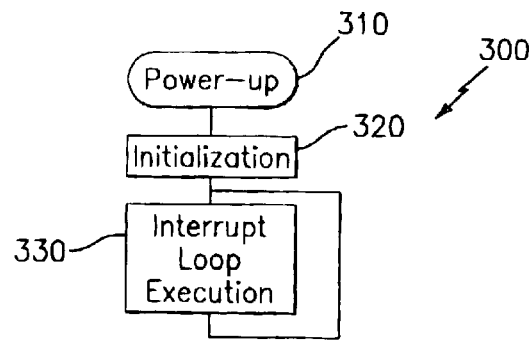
FIG. 2 depicts a generalized flowchart for implementing the present invention.

Referring to FIG. 2, a generalized flowchart 300 for implementing the present invention begins at power-up 310, followed by initialization 320, which resets all of the system flags, registers and timers. The interrupt-loop-execution 330 step cycles through the control logic at the sampling rate "T", which is best seen by referring to FIG. 3.

In FIG. 3, process 400 depicts the process represented by block 330 in FIG. 2, which begins at start 410 and proceeds to step 420 where vehicle parameters, such as, vehicle yaw rate ("Yaw"), vehicle speed ("Vx"), vehicle lateral acceleration ("ay"), vehicle steering angle ("d"), and master cylinder pressure ("MCP"), are sensed by sensors 110, 120, 130, 150, 155, respectively. The vehicle yaw rate error ("Ye") is then calculated 430 according to the equation;

$$Ye = \text{Yaw\_command} - \text{Yaw}. \quad \text{Equa. 2.}$$

The "VSE" flag is set according to the following;

$$\text{If } Ye > Ye\_th \quad \text{Equa. 3}$$

$$\text{Then, VSE=ON} \quad \text{Equa. 4}$$

$$\text{Else, VSE=OFF.} \quad \text{Equa. 5}$$

Equations 3–5 provide one exemplary method of setting the VSE flag. Another exemplary method of setting the VSE flag involves an algorithm for computing the yaw rate error (Ye) and the rate of yaw rate error (Ye'), computing proportional and derivative terms for Ye and Ye' by multiplying Ye and Ye' by proportional and derivative gains, respectively, comparing the absolute value of the sum of these terms to a threshold, and setting the VSE flag to ON if the absolute value of the sum is greater than a threshold value and the vehicle speed is greater than a velocity threshold.

At step 430, the vehicle yaw rate error is typically passed through a low pass filter having a bandwidth, for example, of about 26 Hertz, thereby filtering out undesirable noise. The calculation 440 of yaw rate error index "OSUS" is depicted in detail in FIG. 4 and is discussed below. The calculations 450 of hi mu surface flag "SFlag(t)" and stability limit flag "LFlag(t)" are depicted in detail in FIGS. 5 and 6 and are discussed below. The actual driving mode "Mode" is determined 460 by controller 200 reading the "Mode" register in memory 230 for a setting of "Normal" or "Sporty". Determining 470 the state of control flags "SFlag (t)" and "LFlag(t)" proceeds according to the flowchart of FIG. 7, which is discussed below. Determining 480 the value of control gain factors "GYe_th" and "GB_r" proceeds in accordance with the flowchart of FIG. 7, discussed below, which directs the control logic to enter a set of look-up tables, depicted below as Tables 1–4, with a yaw rate error index ("OSUS" index) as input to the tables. Process 400 concludes at step 490, at which point control logic returns to process 300 and proceeds according to control sampling rate "T", or until such time as the system is powered down.

Figure 4:
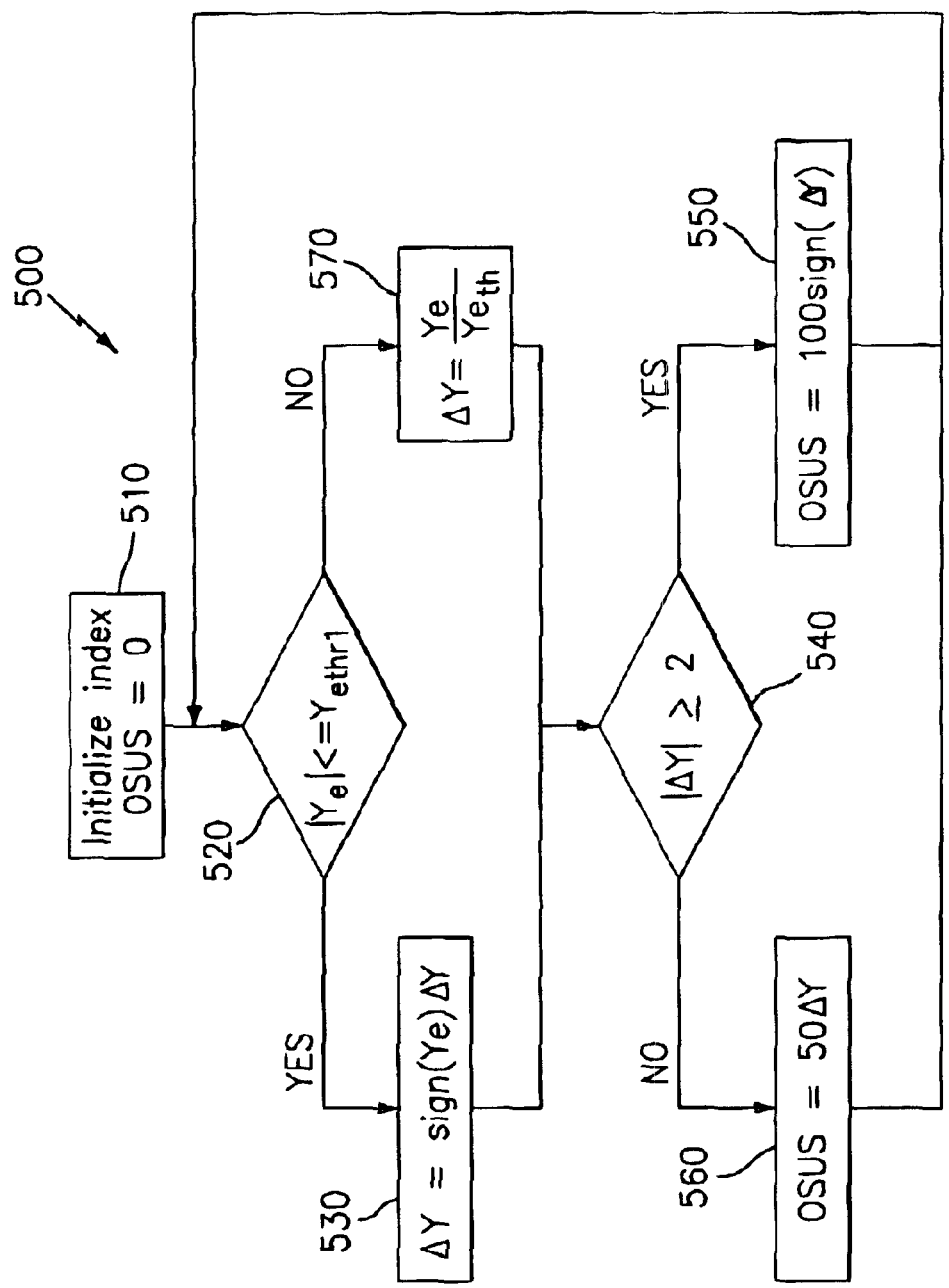
FIG. 4 depicts a flowchart for calculating a yaw rate error index in accordance with the present invention.

Referring now to FIG. 4, which depicts a flowchart 500 for calculating yaw rate error index "OSUS", the process starts with "OSUS" being initialized 510 to zero. The process continues by determining 520 whether the absolute value of the vehicle yaw rate error "|Ye|" is less than or equal to the calibration value "Ye_thr1". If the conditions of block 520 are satisfied, then control logic continues to block 530 where the ratio of yaw rate error to yaw threshold, "delta_ Y", is calculated 530 according to the equation;

$$delta\_Y(new) = sign(Ye) * delta\_Y(old),\quad\quad\text{Equa. 6.}$$

where (new) and (old) represent the values of delta_Y at two consecutive iterative steps in the process. The control logic then passes to block 540 where it is determined whether the absolute value of delta_Y is greater than or equal to the quantity "2". It will be appreciated that the quantity "2" is a matter of choice and may be some other value that functionally can be used to differentiate between OSUS indexes. If the conditions of block 540 are satisfied, then "OSUS" is calculated 550 according to the equation;

$$OSUS = 100 * sign(delta\_Y).\quad\quad\text{Equa. 7.}$$

If the conditions of block 540 are not satisfied, then "OSUS" is calculated 560 according to the equation;

$$OSUS = 50 * delta\_Y.\quad\quad\text{Equa. 8.}$$

If the conditions of block 520 are not satisfied, then control logic passes to block 570 where the ratio of yaw rate error to yaw threshold, "delta_Y", is calculated 570 according to the equation;

$$delta\_Y = Ye/Ye\_th.\quad\quad\text{Equa. 9.}$$

After block 570, control logic passes to block 540 and follows the process as discussed above. At the conclusion of process 500, a vehicle OSUS index is determined. After blocks 550 and 560, control logic passes back to block 520.

Figure 5:
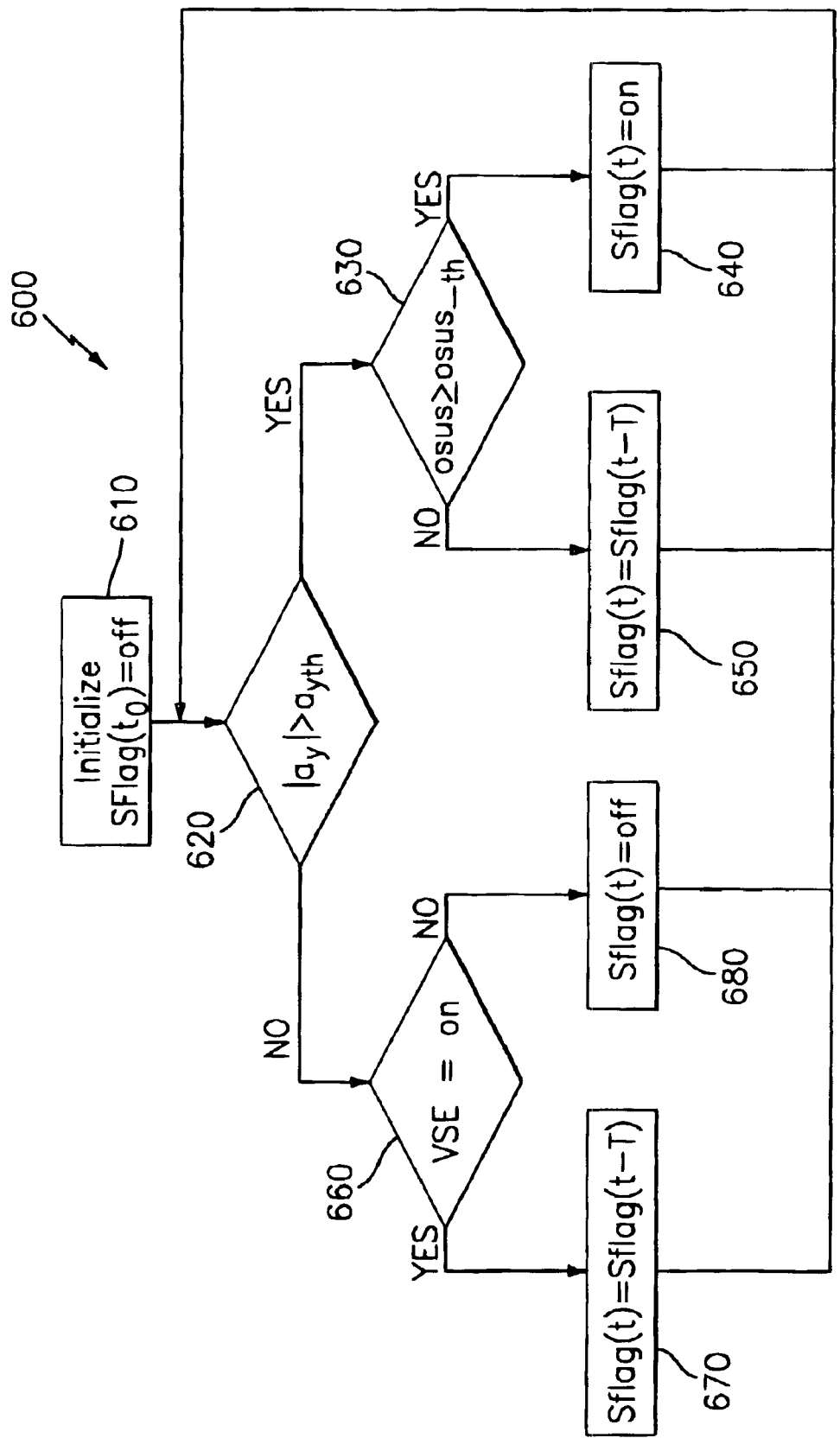
FIG. 5 depicts a flowchart for calculating a first control flag in accordance with the present invention.

Referring now to FIG. 5, a flowchart 600 for calculating a hi mu surface flag "SFlag(t)" (a first control flag) is depicted. This algorithm detects if the vehicle is generating a large lateral acceleration, and the "SFlag(t)" is used to differentiate between high friction (hi mu) and low friction (low mu) surface conditions, thereby providing appropriate adjustment of the yaw rate error threshold ("Ye_th") and brake pressure apply rate ("B_r") by applying appropriate gain factors from look-up Tables 1–4. Process 600 starts by initializing 610 "SFlag(t)" to zero, and then proceeds to block 620 where it is determined whether the absolute value of the lateral acceleration "|ay|" is greater than the lateral acceleration threshold "ay_th". If the conditions of block 620 are satisfied, then control logic proceeds to block 630 where it is determined whether the value of "OSUS" is greater than or equal to a vehicle OSUS index threshold "OSUS_th". If the conditions of block 630 are satisfied, then "SFlag(t)" is calculated 640 according to the following;

$$SFlag(t) = ON.\quad\quad\text{Equa. 10.}$$

If the conditions of block 630 are not satisfied, then "SFlag(t)" is calculated 650 according to the following;

$$SFlag(t) = SFlag(t-T),\quad\quad\text{Equa. 11.}$$

where T is the control sampling time interval.

If the conditions of block 620 are not satisfied, then control logic passes to block 660 where it is determined 660 whether the vehicle stability enhancement flag "VSE" is ON.

If the conditions of block 660 are satisfied, then control logic passes to block 670 where "SFlag(t)" is calculated 670 according to the following;

$$SFlag(t) = SFlag(t-T).\quad\quad\text{Equa. 12.}$$

If the conditions of block 660 are not satisfied, then control logic passes to block 680 where "SFlag(t)" is calculated 680 according to the following;

$$SFlag(t) = OFF.\quad\quad\text{Equa. 13.}$$

At the conclusion of process 600, an "SFlag(t)" state is calculated. After blocks 640, 650, 670 and 680, control logic passes back to block 620.

Figure 6:
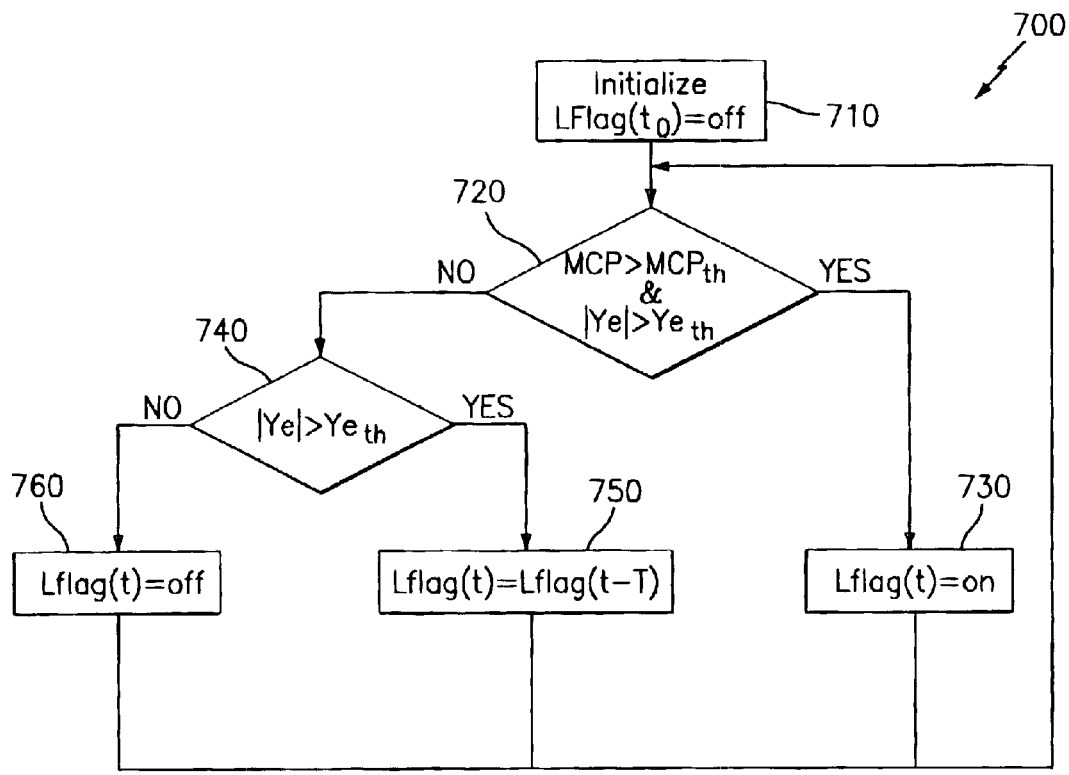
FIG. 6 depicts a flowchart for calculating a second control flag in accordance with the present invention.

Referring now to FIG. 6, a flowchart 700 for calculating a stability limit flag "LFlag(t)" (second control flag) is depicted. This algorithm detects if the vehicle is at its stability limit when the vehicle is operating in the sporty mode, thereby providing the VSE system with more authority for avoiding vehicle instability. Process 700 starts by initializing 710 "LFlag(t)" to zero. The process continues by determining 720 whether the master cylinder pressure "MCP" is greater than the master cylinder pressure threshold "MCP_th", and whether the absolute value of yaw rate error "Ye" is greater than the yaw rate error threshold "Ye_th". If the conditions of block 720 are satisfied, then "LFlag(t)" is calculated 730 according to the following;

$$LFlag(t) = ON.\quad\quad\text{Equa. 14.}$$

If the conditions of block 720 are not satisfied, then control logic passes to block 740 where it is determined 740 whether the absolute value of the yaw rate error "Ye" is greater than the yaw rate error threshold "Ye_th". If the conditions of block 740 are satisfied, then "LFlag(t)" is calculated 750 according to the following;

$$LFlag(t) = LFlag(t-T),\quad\quad\text{Equa. 15.}$$

If the conditions of block 740 are not satisfied, then "LFlag(t)" is calculated 760 according to the following;

$$LFlag(t) = OFF.\quad\quad\text{Equa. 16.}$$

At the conclusion of process 700, an "LFlag(t)" state is calculated. After blocks 730, 750, and 760, control logic passes back to block 720.

Figure 7:
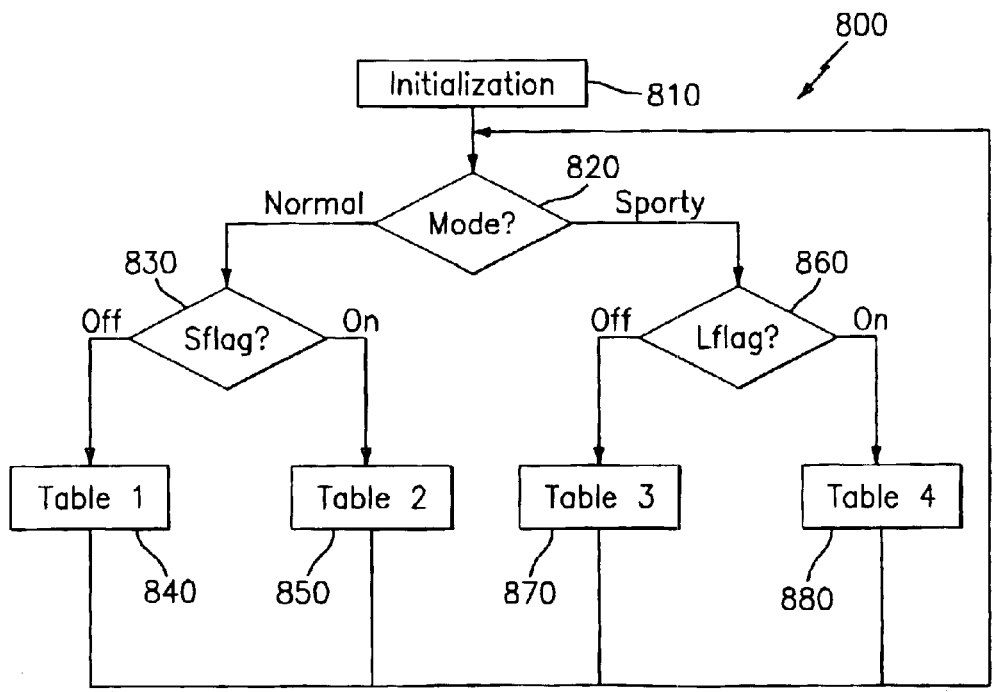
FIG. 7 depicts a flowchart for determining at least one gain factor in accordance with the present invention.

Referring to FIG. 7, a flowchart 800 for determining gain factors "GYe_th" and "GB_r" is depicted. This algorithm determines the adjustments needed on the yaw rate error threshold, "Ye_th", and the brake pressure apply rate, "B_r", when the VSE system is activated. Process 800 starts by initializing 810 the gain factors to unity, and then proceeds by determining 820 whether the actual driving mode "Mode" is set to "Normal" or "Sporty". If the "Mode" is set to "Normal", then control logic proceeds to block 830 where the "SFlag(t)" setting is determined 830. If "SFlag(t)" is set to OFF, then the control logic determines 840 gain factors from look-up Table 1. If at block 830 the "SFlag(t)" is set to ON, then the control logic determines 850 gain factors from look-up Table 2. If at block 820 the "Mode" is set to "Sporty", then control logic proceeds to block 860 where the "LFlag(t)" setting is determined 860. If "LFlag(t)" is set to OFF, then the control logic determines 870 gain factors from look-up Table 3. If at block 860 the "LFlag(t)" is set to ON, then control logic determines 880 gain factors from look-up Table 4. At the conclusion of process 800, gain factors "GYe_th" and "GB_r" are determined. After blocks 840, 850, 870, and 880, control logic passes back to block 820.

TABLE 1

| | OSUS Index | | | | |
|---|---|---|---|---|---|
| | −100 | −50 | 0 | 50 | 100 |
| Yaw rate error threshold gain | 0.8 | 0.8 | 1 | 0.8 | 0.8 |
| Brake pressure apply rate gain | 2 | 2 | 1 | 1.2 | 1.2 |

TABLE 2

| | OSUS Index | | | | |
|---|---|---|---|---|---|
| | −100 | −50 | 0 | 50 | 100 |
| Yaw rate error threshold gain | 1 | 1 | 1 | 1.2 | 1.2 |
| Brake pressure apply rate gain | 2 | 2 | 1 | 1.4 | 1.4 |

TABLE 3

| | OSUS Index | | | | |
|---|---|---|---|---|---|
| | −100 | −50 | 0 | 50 | 100 |
| Yaw rate error threshold gain | 1.4 | 1.4 | 1 | 0.85 | 0.85 |
| Brake pressure apply rate gain | 1.2 | 1.2 | 1 | 0.8 | 0.8 |

TABLE 4

| | OSUS Index | | | | |
|---|---|---|---|---|---|
| | −100 | −50 | 0 | 50 | 100 |
| Yaw rate error threshold gain | 0.8 | 0.8 | 1 | 0.9 | 0.8 |
| Brake pressure apply rate gain | 2 | 2 | 1 | 1.2 | 1.2 |

Control Logic Generally

At the control sampling rate of "T", the microprocessor in controller 200 executes the control algorithms (control logic) depicted in FIGS. 2–7. For each time interval "T", each algorithm is executed once. At the outset, the system is initialized 320, 510, 610, 710, 810. After initialization, the control logic proceeds to the interrupt-loop-execution 330 step depicted in FIG. 2, which cycles the control logic through the process depicted in FIG. 3. FIG. 3 depicts an arrangement of sub-algorithms that are separately depicted in FIGS. 4–7. Upon the completion of a single cycle through each sub-algorithm, the control logic passes back to the appropriate step in process 400 from whence it came. Upon the completion of all steps in process 400, the control logic passes back to the main algorithm of process 300, where the entire routine is cycled over again until it is interrupted.

At the conclusion of one cycle through process 300, a yaw rate error threshold gain, "GYe_th", and a brake pressure apply rate gain, "GB_r", are determined. These gains are in response to an "OSUS" index, an "SFlag(t)" or "LFlag(t)" setting, a "Mode" setting, and a comparison between vehicle parameters and parameter threshold levels. The gain factors that are extracted from look-up Tables 1–4 are used by controller 200 to adjust the yaw rate error threshold level and the brake pressure apply rate, thereby modifying how controller 200 controls mechanism control systems 160, 170, 180. The yaw rate error threshold gain effects the timing for activation of the VSE system, while the brake pressure apply rate gain effects how fast the brake is applied to the wheel under control. The end result is a change in the way the VSE system affects the overall characteristics of the vehicle under certain driving conditions. For example, if the driver wants to drive the vehicle in sporty mode, the VSE system tuning is such that the driver is allowed to have more control of the vehicle and there is less control intervention by the VSE system. However, if the VSE system detects an unstable condition pending, then the VSE system tuning will provide more control to stabilize the vehicle. On the other hand, if the driver wants to drive the vehicle in a normal mode, then the VSE system tuning will provide the VSE system with more control intervention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle stability enhancement system for a vehicle having at least one vehicle subsystem, comprising:

at least one sensor for sensing at least one vehicle parameter;

at least one vehicle control system for adjusting the at least one vehicle subsystem;

a driving mode switch for selecting at least one driving mode;

at least one memory comprising at least one set of gain factors, said at least one memory including a VSE flag register settable to OFF and ON; and a controller responsive to said at least one sensor, said driving mode switch, and said at least one set of gain factors for controlling said at least one vehicle control system;

wherein the vehicle stability enhancement system is activated in response to said VSE flag being ON, and not activated in response to said VSE flag being OFF;

wherein said at least one memory further comprises:

a vehicle yaw rate error register for storing a vehicle yaw rate error value; and a vehicle yaw rate error threshold register for storing a vehicle yaw rate error threshold value; wherein said VSE flag register is set to ON in response to the absolute value of said vehicle yaw rate error exceeding said vehicle yaw rate error threshold value.

2. The vehicle stability enhancement system of claim 1, wherein said at least one sensor comprises:

a yaw sensor for sensing the vehicle yaw rate;

at least one velocity sensor for sensing the velocity of the vehicle;

a lateral acceleration sensor for sensing the vehicle lateral acceleration;

a steering angle sensor for sensing the vehicle steering angle; and a pressure sensor for sensing the brake fluid pressure; wherein signals from said sensors are received at said controller.

3. The vehicle stability enhancement system of claim 1, wherein said at least one vehicle control system comprises:

a steering mechanism control system for adjusting a steering mechanism; and a braking mechanism control system for adjusting a braking mechanism.

4. The vehicle stability enhancement system of claim 1, wherein said at least one memory further comprises:

at least one look-up table comprising said at least one set of gain factors.

5. The vehicle stability enhancement system of claim 1, wherein said at least one set of gain factors comprises:

a yaw rate error threshold gain factor; and a brake pressure apply rate gain factor.

6. The vehicle stability enhancement system of claim 1, wherein said at least one memory further comprises:

at least one vehicle parameter register for storing at least one vehicle parameter value in response to said at least one sensor;

at least one vehicle parameter threshold register for storing at least one vehicle parameter threshold value; and an OSUS index register settable to at least one value in response to the absolute value of said at least one vehicle parameter exceeding said at least one vehicle parameter threshold value.

7. The vehicle stability enhancement system of claim 6, wherein:

said at least one set of gain factors have values responsive to said at least one value of said OSUS index.

8. The vehicle stability enhancement system of claim 1, wherein said at least one memory further comprises:

an SFlag register settable to OFF and ON for indicating the state of a high friction surface flag;

an LFlag register settable to OFF and ON for indicating the state of a limit stability flag; and an OSUS index register settable to at least one value in response to said SFlag and said LFlag register settings.

9. A method for actively controlling a vehicle stability enhancement system, comprising:

sensing at least one vehicle parameter;

calculating a yaw rate error index in response to the at least one vehicle parameter;

calculating the state of at least one control flag in response to the at least one vehicle parameter;

setting a VSE flag to either a first state representative of an activated VSE system or a second state representative of a non-activated VSE system;

determining the state of a driving mode in response to a driving mode request;

determining the state of the at least one control flag in response to the state of the driving mode;

determining at least one control gain factor in response to the state of the at least one control flag and the yaw rate error index; and activating the vehicle stability enhancement system in response to the VSE flag being set to the first state;

wherein said calculating the state of at least one control further comprises:

calculating the state of the VSE flag to ON in response to the absolute value of the vehicle yaw rate error exceeding the vehicle yaw rate error threshold value.

10. The method of controlling set forth in claim 9, wherein said sensing at least one vehicle parameter further comprises:

sensing the vehicle yaw rate;

sensing the vehicle velocity;

sensing the vehicle lateral acceleration;

sensing the brake fluid pressure; and sensing the vehicle steering angle.

11. The method of controlling set forth in claim 9, wherein said calculating a yaw rate error index further comprises:

calculating a yaw rate error index in response to the ratio of vehicle yaw rate error to vehicle yaw rate error threshold.

12. The method of controlling set forth in claim 9, wherein said calculating the state of at least one control flag further comprises:

calculating the state of an SFlag register for indicating the state of a high friction surface flag; and calculating the state of an LFlag register for indicating the state of a limit stability flag.

13. The method of controlling set forth in claim 12, wherein said calculating the state of an SFlag register comprises:

calculating the SFlag to an ON state.

14. The method of controlling set forth in claim 12, wherein said calculating the state of an LFlag register comprises:

calculating the LFlag to an OFF state.

15. The method of controlling set forth in claim 9, wherein said determining the state of a driving mode further comprises:

determining whether the driving mode is Normal or Sporty.

16. The method of controlling set forth in claim 9, wherein said determining at least one control gain factor further comprises:

determining a yaw rate error threshold gain factor; and determining a brake pressure apply rate gain factor.

17. A vehicle stability enhancement system for a vehicle having a vehicle subsystem, the vehicle stability enhancement system settable to an active and an inactive state, the vehicle stability enhancement system comprising:

a sensor for sensing a vehicle parameter;

a driving mode switch for selecting a driving mode;

a VSE flag indicative of an activated or a non-activated vehicle stability enhancement system;

a vehicle control system for adjusting the vehicle subsystem; and a controller responsive to the sensor, the driving mode, and the VSE flag, for controlling the vehicle control system;

wherein the vehicle subsystem is responsive to the controller in response to the vehicle stability enhancement system being activated, and wherein the vehicle subsystem is not responsive to the controller in response to the vehicle stability enhancement system not being activated;

wherein said VSE flag is indicative of an active vehicle stability enhancement system in response to a vehicle yaw rate error exceeding a threshold value, and is indicative of an inactive vehicle stability enhancement system in response to a vehicle yaw rate error not exceeding the threshold value.

18. The vehicle stability enhancement system of claim 17, further comprising:

a memory having at least one set of gain factors, said at least one set of gain factors comprising:

a yaw rate error threshold gain factor; and a brake pressure apply rate gain factor.

19. The vehicle stability enhancement system of claim 17, further comprising at least one memory, said at least one memory further comprising:

an SFlag register settable to OFF and ON for indicating the state of a high friction surface flag;

an LFlag register settable to OFF and ON for indicating the state of a limit stability flag; and an OSUS index register settable to at least one value in response to said SFlag and said LFlag register settings.

\* \* \* \* \*